US006516087B1

(12) United States Patent
Camus

(10) Patent No.: US 6,516,087 B1
(45) Date of Patent: Feb. 4, 2003

(54) METHOD FOR REAL TIME CORRELATION OF STEREO IMAGES

(75) Inventor: Theodore A. Camus, Mount Laurel, NJ (US)

(73) Assignee: Sensar, Inc., Moorestown, NJ (US)

( * ) Notice: Subject to any disclaimer, the term of this patent is extended or adjusted under 35 U.S.C. 154(b) by 0 days.

(21) Appl. No.: 09/480,371

(22) Filed: Jan. 10, 2000

(51) Int. Cl.$^7$ ................................................. G06K 9/00
(52) U.S. Cl. ...................................... 382/154; 345/419
(58) Field of Search ................................ 382/154, 278, 382/284; 345/419, 420, 421, 422, 423, 424, 426, 427, 428; 348/47; 356/12

(56) References Cited

U.S. PATENT DOCUMENTS

| | | | |
|---|---|---|---|
| 4,661,986 A | 4/1987 | Adelson | 382/41 |
| 4,797,942 A * | 1/1989 | Burt | 382/284 |
| 5,119,444 A | 6/1992 | Nishihara | |
| 5,259,040 A | 11/1993 | Hanna | |
| 5,325,449 A | 6/1994 | Burt et al. | 382/56 |
| 5,488,674 A | 1/1996 | Burt et al. | 382/284 |
| 5,550,937 A * | 8/1996 | Bell et al. | 382/293 |
| 5,963,664 A | 10/1999 | Kumar et al. | |

OTHER PUBLICATIONS

"Practical Real–Time Imaging Stereo Matcher," Nishihara, *Optical Engineering*, 23(5), pp. 536–545, Sep./Oct. 1984.
"Electronically Directed 'Focal' Stereo" by Peter J. Burt et al., Proceedings of the Fifth International Conference on Computer Vision, pp. 94–101, Jun. 1995.
"Real–time Scene Stablization and Mosaic Construction," M. Hansen et al., Proceedings of the ARPA Image Understanding Workshop, Monterey, CA, Nov., 1994.

"Small Vision Systems: Hardware and Implementation," Kurt Konolige at the Eighth International Symposium on Robotics Research, Hayama, Japan, Oct., 1997.
"VLSI Pyramid Chip for Multiresolution Image Analysis," Gooitzen S. Van Der Wal and Peter J. Bert, *International Journal of Computer Vision*, 8:3, 177–189 (1992).
"The Laplacian Pyramid as a Compact Image Code," Peter J. Bert, *IEEE Transactions on Communications*, vol. Com–31, No. 4, Apr., 1983.

* cited by examiner

Primary Examiner—Samir Ahmed
(74) Attorney, Agent, or Firm—Woodcock Washburn LLP

(57) ABSTRACT

In a method for correlating two stereo images, the images are subjected to a Laplacian operator and further processed to produce reduced gray scale Laplacian images in which the pixels have a value of +1, 0 or −1. Then the two images are overlapped to produce pairs of overlapping pixels. The values of the two overlapping pixels are summed in a manner so that if both pixels are +1 or both pixels are −1 the summed value is +1, if one pixel is +1 and the other pixel is −1, the resulting sum is −1 and if one or both pixel are zero, the resulting sum is zero. All of the sums or correlation values in regions about each pixel in the two overlapping images are added together to get a new correlation value for each pixel in the overlap resulting in a correlation image. Then, the two Laplacian images are shifted relative to one another and correlation values are again computed for this new overlap. This process is repeated several times resulting in correlation values for each overlap. For each pixel, the overlap which has the highest correlation value is the best match. Having determined the best match one can then determine the location of an object or point in the field of view using standard stereo processing techniques.

7 Claims, 2 Drawing Sheets

METHOD FOR REAL TIME CORRELATION OF STEREO IMAGES

FIELD OF INVENTION

The invention relates to a method of comparing two stereo images to determine a location of an object or point in a field of view.

BACKGROUND OF THE INVENTION

It is well-known that the position of an object in a volume can be determined using two spaced apart cameras. Both cameras take an image of the object at the same time or nearly the same time. Then the images are compared to determine the location in each image of a point or series of points on the object. From that information one can calculate the location of the object in the volume such that each point on the object has a known and different x, y, z coordinate.

Today there are algorithms which allow computers to perform image matching of two stereo images. Typical images from a video camera contain a 640×480 array of pixels. In a "black and white" image each pixel will have a gray scale value of from 0 to 255. Current algorithms use the gray scale values to perform pixel comparisons to identify the position of an object in one image with respect to the other image. Although this method is quite accurate, substantial computer capacity is needed to perform the image matching and the process is relatively slow. As a result more expensive computer hardware is needed to do stereo image processing. Thus, one must either use expensive image processing hardware to achieve near real time processing or be satisfied with the slow processing speeds that occur with off the shelf computing components such as a personal computer (PC). Consequently, there is a need for a method of determining the position of an object from stereo images which is fast and can be performed on a low cost computer.

For many years the art has used the Laplacian pyramid to process and compress images as part of stereo processing. Compressed images are easier to store and transmit. When an image is subjected to a series of Laplacian transforms via pyramid processing the image becomes successively smaller dimensionally; however, the gray scale information remains at 8 bits. Each higher level array is half the dimensions of its predecessor. Prior to the present invention the art used these full gray scale Laplacian images for stereo image correlation which requires much computational complexity. Yet, I have found that by reducing the gray scale dimensionality of the Laplacian images I can correlate stereo images significantly faster using a simple processor.

SUMMARY OF THE INVENTION

I provide a method for correlating two stereo images in which the images are subjected to a Laplacian operator to produce reduced grayscale Laplacian images in which the pixels have a value of +1, 0 or −1. Then, I overlap the two images to produce pairs of overlapping pixels. The values of the two overlapping pixels are summed in a manner so that if both pixels are +1 or both are −1 the summed value is +1, if one pixel is +1 and the other pixel is −1, the resulting sum is −1 and if one or both pixels are zero the resulting sum is zero. All of the correlation values for the regions about the two overlapping pixels are combined to get a correlation value for the pair of pixels that overlap generating a correlation image. Then, the two Laplacian images are shifted relative to one another and correlation values are computed for each pair of pixels for this particular overlap. This process is repeated several times resulting in correlation images for each overlap. The overlap which has the highest correlation value is the best match for that pixel. Having determined the best match for each pixel, one can then determine the location of an object or point in the field of view using standard stereo processing techniques. Other objects and advantages of the method will become apparent from a description of certain present preferred embodiments illustrated in the drawings.

DESCRIPTION OF THE PREFERRED EMBODIMENTS

Figure 1:
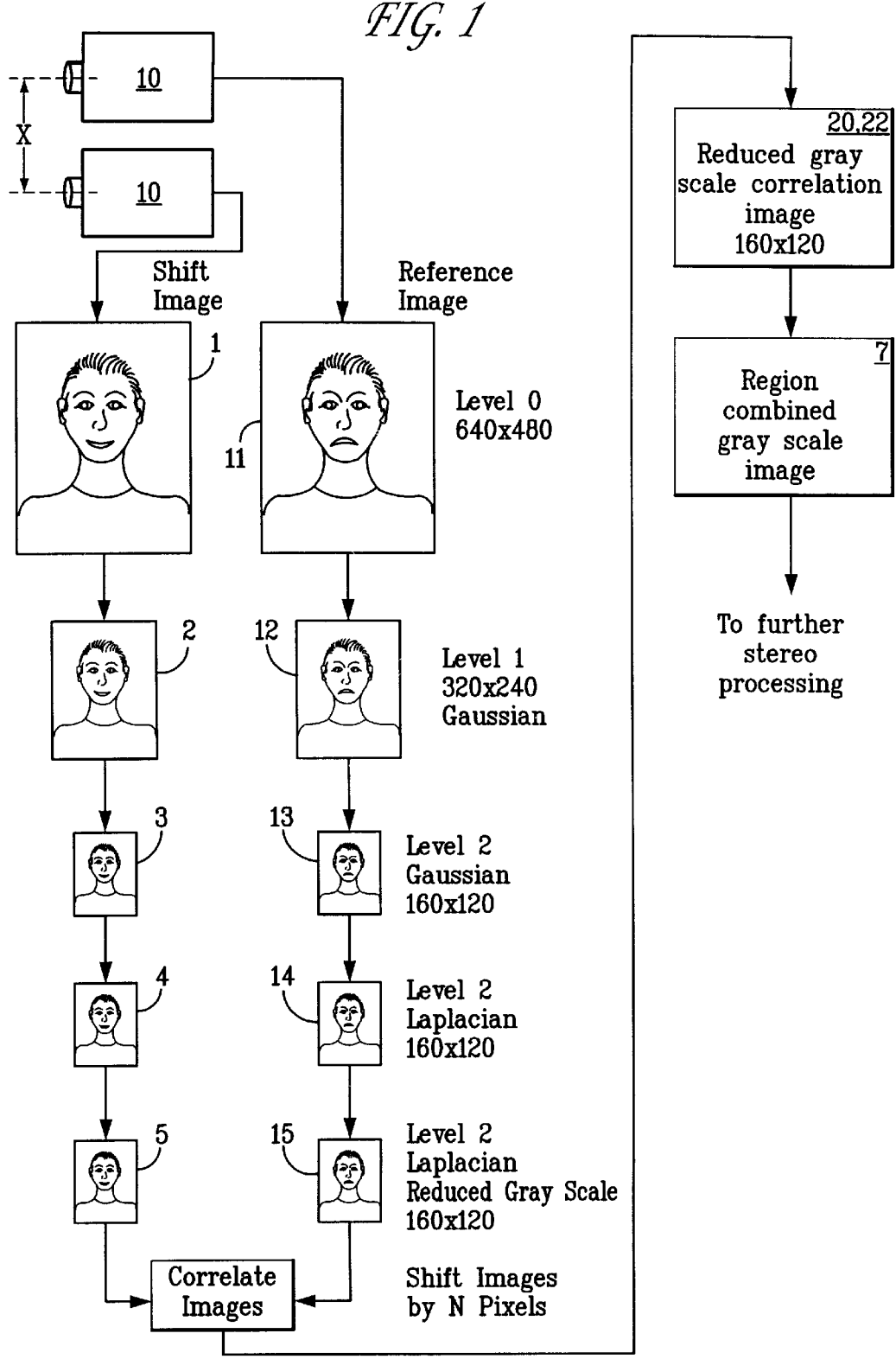
FIG. 1 is a diagram illustrating the images used for stereo processing.

To correlate stereo images I begin with two images, each from one or the other of two spaced apart cameras. The first image will be called the reference image and the second image will be called the shift image. In the present method the original image 1 and 11 from each camera 10 is subjected to a Gaussian pyramid to produce transformed images 2, 3, 12 and 13. The original gray scale images are dimensionally reduced and scaled by using the Gaussian pyramid. The original 640×480 image is reduced to a 320×240 image (level 1 Gaussian image) and further reduced to a 160×120 image (level 2 Gaussian image). The images are shown in the drawings to contain a person's head. For purposes of illustration only a simple outline is shown. However, in actual images there would be much greater detail, particularly in the original image. The amount of detail becomes progressively less for each level from the original image at level 0 to the level 2 Gaussian image 3 and 13. This process reduces the physical size of the image as well as making subsequent processing more robust with respect to sensor or other noise that may be present. It should be noted that the image reduction is not a necessary step for this invention and the original image 1 and 11, could be used in subsequent steps.

Next, the Laplacian of image 3 and 13 is taken giving images 4 and 14 each a 160×120 gray scale image. A Laplacian image shows the high frequency content of the original image and is generally a signed 8 bit number. This Laplacian may be part of the Gaussian pyramid used to generate images 2, 3, 12 and 13 or the Laplacian may be performed using standard formulae.

The next step of the process is to reduce the gray scale of image 4 and 14, producing images 5 and 15, called a reduced gray scale Laplacian image. A reduced gray scale Laplacian image is one in which each pixel will have one of three values {−1, 0, +1 }. Values greater than or equal to 1 are assigned a value of 1, those less than or equal to −1 are assigned a value of −1 and those with a value of 0 are assigned the value of 0. This gray scale mapping accentuates the edges of the image. This reduced gray scale Laplacian is used to perform the correlation needed for stereo processing.

Figure 2:
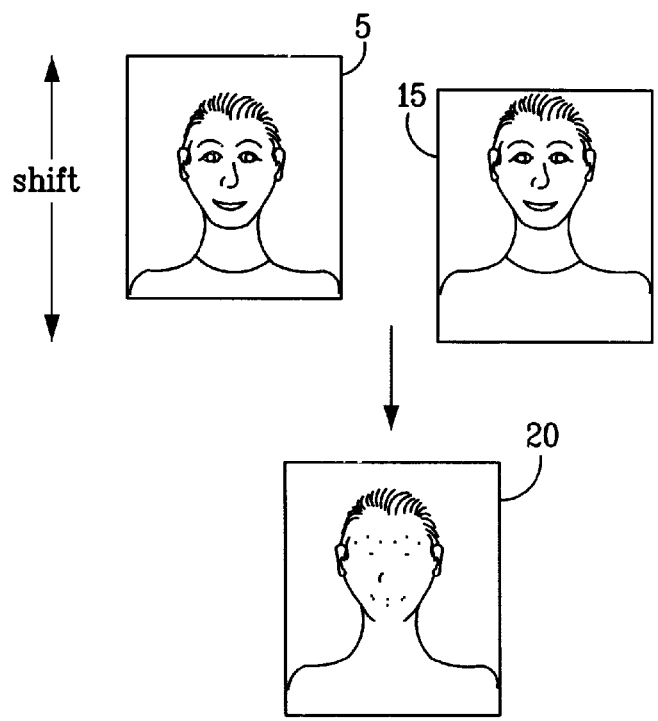
FIG. 2 is a diagram illustrating creation of correlation images by shifting Laplacian images in a vertical direction.
Figure 3:
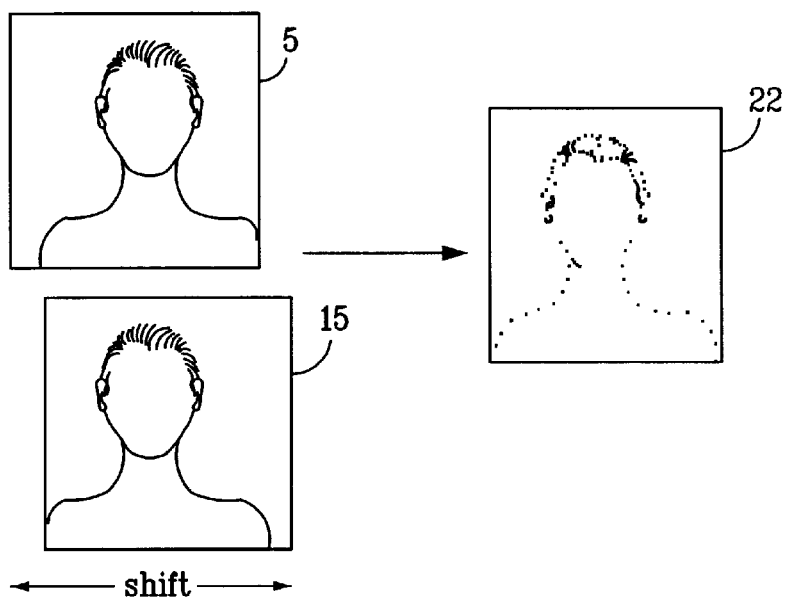
FIG. 3 is a diagram illustrating creation of correlation images by shifting Laplacian images in a horizontal direction.

The reduced gray scale Laplacian images 5 and 15 from each camera are overlapped as indicated in FIGS. 2 and 3 and summed to produce a correlation image 20 or 22.

Although one could sum all pairs of overlapping pixels to create correlation images I have found that summing pixels along objects' edges of one image with corresponding pixels in the second image is sufficient. When only edge pixels are summed correlations can be made much faster. Consequently, the correlation image may be derived for simpler reduced grayscale Laplacian images. This is the reason for generating reduced grayscale Laplacian images. In summing the pixel values of overlapping pixels if both pixels are +1 or both pixels are −1, the summed value is +1. If one pixel is +1 and the other pixel is −1, the summed value is −1. If one or both pixels have a zero value, the sum is zero. The following matrix shows correlation values for various pairs of pixels.

$$\text{Image 2} \begin{array}{cccc} & \text{Image 1} & & \\ & -1 & 0 & +1 \\ -1 & +1 & 0 & -1 \\ 0 & 0 & 0 & 0 \\ +1 & -1 & 0 & +1 \end{array}$$

The correlation image 20 or 22 is also a reduced grayscale image containing only the values {−1, 0, 1}. For stereo processing it is desired to find a maximum correlation value corresponding to each pixel location in the reference image. Thus, images 20 or 22 must be processed further to generate a region combination gray scale image 7. This image 7 is a gray scale image which has continuous values through each pixel. Image 7 is created by combining all pixel pair values for a surrounding region such as by using a weighted kernel. Thus, in the case of a uniformly weighted kernel, all the signed numbers resulting from the correlation surrounding a given pixel would be added together. One example of kernel size would be a 3×3 kernel, the center of the kernel would be placed on coordinates of the pixel of interest of image 20 or 22 and the correlation values would be multiplied by the corresponding kernel values to form the corresponding value in image 7.

In making the correlation the Laplacian images are overlapped several times to create a set of correlation images. The various overlaps are created by shifting one image relative to another in a vertical direction as indicated in FIG. 2 or by shifting one image relative to the other image in a horizontal direction as indicated in FIG. 3. The use of a vertical or horizontal shift is dependent on the orientation of the cameras, and how they are spaced apart. In general stereo cameras 10 are only displaced in one direction with their optical axes being separated by some distance x as indicated in FIG. 1. After correlation images have been found for several overlaps I select for each pixel in the non-shifted reference image the overlap image (in the format of image 7) having the highest correlation value as the best match. Then I can use each overlap to determine the position of the object in the field of view using standard stereo processing algorithms and techniques.

This technique can be used to correlate all types of stereo images. Depending on the subject and the background greater or fewer combinations of pairs of overlapping pixels can be used to obtain a correlation value.

Although I have described certain present preferred embodiments of my method, the invention is not limited thereto, but may be variously embodied within scope of the following claims.

I claim:

1. A method for stereo imaging correlation comprising:
   a. taking a reference image of a subject with a first stereo camera the reference image comprised of a first set of pixels, each pixel having a unique coordinate and gray scale value;
   b. taking a shift image of the subject with a second stereo camera, the shift image comprised of a second set of pixels, each pixel having a unique coordinate and gray scale value, the second camera spaced from the first camera in one dimension;
   c. performing Laplacian transforms on the reference image and the shift image to form a reference gray scale Laplacian image and a shift gray scale Laplacian image;
   d. forming a reduced gray scale Laplacian reference image and a reduced gray scale Laplacian shift image such that each pixel in the reduced gray scale Laplacian images are assigned a value of +1, 0 or −1;
   e. performing a correlation between the reference reduced gray scale Laplacian image and the shift reduced gray scale Laplacian image images comprising the steps of:
      i) overlapping the reference reduced gray scale Laplacian image and the shift reduced gray scale Laplacian image to create an overlap image having pairs of overlapping pixels;
      ii) combining the assigned values of selected pairs of overlapping pixels to form a reduced gray scale correlation image of correlation values, one correlation value for each pair of overlapping pixels;
      iii) combining regions of the reduced gray scale correlation image so that a continuous correlation function exists for the image;
      iv) shifting the shift reduced gray scale Laplacian image relative to the reference reduced gray scale Laplacian image; and
      v) repeating steps i) through iv) to create a set of gray scale overlap correlation images;
   f. using the gray scale overlap correlation images to select an overlap per pixel in the reference image; and
   g. using the selected overlap to determine a position of at least one point on the subject.

2. The method of claim 1 wherein the selected pairs of overlap pixels correspond to a single region of adjacent pixels from a first correlation image and a single region of adjacent pixels from a second correlation image.

3. The method of claim 1 wherein the selected pairs of overlap pixels correspond to pixels within at least two distinct regions of a first correlation image and to pixels from at least two distinct regions of a second correlation image.

4. The method of claim 3 wherein the combining of assigned values is performed using a non-uniform weighted kernel.

5. The method of claim 1 wherein a stereo processing algorithm is used to determine at least one point on the subject.

6. The method of claim 1 wherein the pixels have one of three values {+1, 0, −1} and the pixel values are summed in a manner such that if both pixels are +1 or both pixels are −1, the sum is +1, if one pixel is −1 and the other pixel is +1, the value is −1 and if at least one pixel is zero, the sum is zero.

7. The method of claim 1 wherein the combining of assigned values is performed using a non-uniform weighted kernel.

* * * * *